United States Patent
Tang et al.

(10) Patent No.: US 7,388,501 B2
(45) Date of Patent: Jun. 17, 2008

(54) METHOD OF ENABLING TWO-STATE OPERATION OF ELECTRONIC TOLL COLLECTION SYSTEM

(75) Inventors: Wai-Cheung Tang, Mannheim (CA); Thua Van Ho, Mississauga (CA)

(73) Assignee: Mark IV Industries Corp, Mississauga, Ontario (CA)

( * ) Notice: Subject to any disclaimer, the term of this patent is extended or adjusted under 35 U.S.C. 154(b) by 229 days.

(21) Appl. No.: 11/437,236

(22) Filed: May 19, 2006

(65) Prior Publication Data

US 2007/0268140 A1  Nov. 22, 2007

(51) Int. Cl.
*G08B 13/14* (2006.01)
(52) U.S. Cl. ............... 340/572.7; 340/572.4; 340/928; 340/10.1
(58) Field of Classification Search ............. 340/572.7, 340/572.4, 928, 10.1, 572.5, 572.1, 572.8, 340/10.2, 10.42, 10.5, 825.49; 343/770, 343/767, 793; 235/375
See application file for complete search history.

(56) References Cited

U.S. PATENT DOCUMENTS

| | | | |
|---|---|---|---|
| 4,104,630 A | 8/1978 | Chasek | |
| 4,303,904 A | 12/1981 | Chasek | |
| 4,816,839 A * | 3/1989 | Landt | 343/795 |
| 4,870,419 A | 9/1989 | Baldwin et al. | |
| 4,937,581 A | 6/1990 | Baldwin et al. | |
| 5,086,389 A | 2/1992 | Hassett et al. | |
| 5,132,687 A | 7/1992 | Baldwin et al. | |
| 5,144,553 A | 9/1992 | Hassett et al. | |
| 5,164,732 A | 11/1992 | Brockelsby et al. | |
| 5,196,846 A | 3/1993 | Brockelsby et al. | |
| 5,253,162 A | 10/1993 | Hassett et al. | |
| 5,266,947 A | 11/1993 | Fujiwara et al. | |

(Continued)

FOREIGN PATENT DOCUMENTS

EP  0 333 679  9/1989

(Continued)

OTHER PUBLICATIONS

Woo et al., Dual Mode Electronic Toll Collection Transponder, U.S. Appl. No. 11/409,897, filed Apr. 24, 2006.

(Continued)

*Primary Examiner*—Anh V. La
(74) *Attorney, Agent, or Firm*—Hanley, Flight & Zimmerman, LLC (57) ABSTRACT

A method and system for communicating state information from a transponder to a reader. The transponder outputs linearly polarized RF signals having either a first polarization, such as horizontal, or a second polarization, such as vertical. The polarization is selected so as to indicate a first state or a second state. The reader detects whether received RF signals have the first polarization or the second polarization, and thereby determines the state of the transponder. In some embodiments, the reader may include two linearly polarized antennas, one with the first polarization and one with the second polarization, for receiving the RF signals from the transponder and determining the polarization of the received RF signals. The system may be implemented within an electronic toll collection system, wherein the transponders are affixed to the interior of vehicle windshields using a rotatable mounting mechanism having two selectable positions.

23 Claims, 5 Drawing Sheets

U.S. PATENT DOCUMENTS

| | | | |
|---|---|---|---|
| 5,289,183 A | 2/1994 | Hassett et al. | |
| 5,310,999 A | 5/1994 | Claus et al. | |
| 5,351,187 A | 9/1994 | Hassett | |
| 5,424,727 A | 6/1995 | Shieh | |
| 5,425,032 A | 6/1995 | Shloss et al. | |
| 5,485,520 A | 1/1996 | Chaum et al. | |
| 5,602,375 A | 2/1997 | Sunahara et al. | |
| 5,640,156 A | 6/1997 | Okuda et al. | |
| 5,657,008 A | 8/1997 | Bantli | |
| 5,675,342 A | 10/1997 | Sharpe | |
| 5,701,127 A | 12/1997 | Sharpe | |
| 5,748,106 A | 5/1998 | Schoenian et al. | |
| 5,751,973 A | 5/1998 | Hassett | |
| 5,771,021 A | 6/1998 | Veghte et al. | |
| 5,777,565 A | 7/1998 | Hayashi et al. | |
| 5,805,082 A | 9/1998 | Hassett | |
| 5,819,234 A | 10/1998 | Slavin et al. | |
| 5,831,547 A | 11/1998 | Ohtsuki et al. | |
| 5,841,866 A | 11/1998 | Bruwer et al. | |
| 5,850,191 A | 12/1998 | Yagi et al. | |
| 5,857,152 A | 1/1999 | Everett | |
| 5,859,415 A | 1/1999 | Blomqvist et al. | |
| 5,940,006 A | 8/1999 | MacLellan et al. | |
| 5,963,149 A | 10/1999 | Nagura et al. | |
| 6,025,799 A | 2/2000 | Ho et al. | |
| 6,085,805 A | 7/2000 | Bates | |
| 6,121,880 A | 9/2000 | Scott et al. | |
| 6,191,705 B1 | 2/2001 | Oomen et al. | |
| 6,219,613 B1 | 4/2001 | Terrier et al. | |
| 6,243,013 B1 * | 6/2001 | Duan et al. | 340/572.7 |
| 6,616,034 B2 | 9/2003 | Wu et al. | |
| 6,661,352 B2 | 12/2003 | Tiernay et al. | |
| 6,725,014 B1 | 4/2004 | Voegele | |
| 6,898,753 B2 | 5/2005 | Bonifas | |
| 7,030,759 B2 * | 4/2006 | Nelson | 340/551 |
| 7,265,675 B1 * | 9/2007 | Carrender et al. | 340/572.7 |
| 2001/0050922 A1 | 12/2001 | Tiernay et al. | |
| 2006/0071816 A1 | 4/2006 | Tang et al. | |
| 2006/0082470 A1 | 4/2006 | Zhu et al. | |

FOREIGN PATENT DOCUMENTS

| | | |
|---|---|---|
| JP | 10-105753 | 4/1998 |
| WO | WO 99/33027 | 1/1999 |

OTHER PUBLICATIONS

Woo et al., Open Road Vehicle Emissions Inspection, U.S. Appl. No. 11/409,741, filed Apr. 24, 2006.

Ho et al., Compact Microstrip Transponder Antenna, U.S. Appl. No. 11/388,737, filed Mar. 24, 2006.

Tang et al., Method and System for Obtaining Traffic Information Using Transponders, U.S. Appl. No. 11/284,277, filed Nov. 21, 2005.

Ho et al., Dynamic Timing Adjustment in an Electronic Toll Collection Systems, U.S. Appl. No. 11/176,758, filed Jul. 7, 2005.

Tang, RF Transponder with Electromechanical Power, U.S. Appl. No. 11/054,520, filed Feb. 9, 2005.

Zhu, U.S. Phase Modulation for Backscatter Transponder, U.S. Appl. No. 11/098,257, filed Apr. 4, 2005.

Zhu, U.S. System and Method for Secure Mobile Commerce, U.S. Appl. No. 10/912,997, filed Aug. 6, 2004.

Ching et al., *A Laser Micromachined Multi-Modal Resonating Power Transducer for Wireless Sensing Systems*, Sensors and Actuators A 97-98 (2002) 685-690, http://www.wlsevier.com.

Finkenzeller, Klaus, *Ch. 3: Fundamental Operating Principles, RFID Handbook: Fundamentals and Applications in Contactless Smart Cards and indentification*, Klause Finkenzellar, (2003) John Wiley & Sons, Ltd. ISBN 0-470-84402-7.

Sorrells, *Passive RFID Basics*, AN680, Microchip Technology Inc., (1998) DS00680B.

* cited by examiner

METHOD OF ENABLING TWO-STATE OPERATION OF ELECTRONIC TOLL COLLECTION SYSTEM

FIELD OF THE INVENTION

The present invention relates to an electronic toll collection system and, in particular, to a method and system for communicating state information in an electronic toll collection system.

BACKGROUND OF THE INVENTION

Electronic toll collection systems conduct toll transactions electronically using RF communications between a vehicle-mounted transponder (a "tag") and a stationary toll plaza transceiver (a "reader"). An example of an electronic toll collection system is described in U.S. Pat. No. 6,661,352 issued Dec. 9, 2003 to Tiernay et al., and owned in common with the present application. The contents of U.S. Pat. No. 6,661,352 are hereby incorporated by reference.

In a typical electronic toll collection (ETC) system, the reader broadcasts a polling or trigger RF signal. A transponder on a vehicle passing through the broadcast area or zone detects the polling or trigger signal and responds with its own RF signal. The transponder responds by sending a response signal containing information stored in memory in the transponder, such as the transponder ID number. The reader receives the response signal and may conduct an electronic toll transaction, such as by debiting a user account associated with the transponder ID number. The reader may then broadcast a programming RF signal to the transponder. The programming signal provides the transponder with updated information for storage in its memory. It may, for example, provide the transponder with a new account balance.

There are a number of pre-defined communication protocols for reader-transponder communications in an ETC system. They include various public TDMA protocols, the State of California Code of Regulation (CAL-TRAN) Title 21 (T21) protocol, and proprietary protocols. An example of the latter may be seen in U.S. Pat. No. 5,196,846 to Brockelsby et al. Various pre-defined protocols are discussed in US Pub. No. US2001/0050922, published Dec. 13, 2001 and owned in common with the present application.

In some circumstances, it may be desirable to communicate additional state information from the transponder to the reader. In existing systems, this may be difficult because there are thousands of existing transponders deployed within the marketplace. These existing transponders may not be easily changed or modified. Accordingly, it would be preferable to provide for a method and system of communicating state information that would not require changes to the existing transponders.

SUMMARY OF THE INVENTION

The present invention provides a method and system for communicating state information from a transponder to a reader. The transponder outputs linearly polarized RF signals having either a first polarization, such as horizontal, or a second polarization, such as vertical. The polarization is selected so as to indicate a first state or a second state. The reader detects whether received RF signals have the first polarization or the second polarization, and thereby determines the state of the transponder. In some embodiments, the reader may include two linearly polarized antennas, one with the first polarization and one with the second polarization, for receiving the RF signals from the transponder and determining the polarization of the received RF signals.

In one aspect, the present invention provides a method for determining a state of a transponder, the transponder having at least a first state of operation and a second state of operation, and the transponder including an antenna for propagating RF signals. The RF signals have a first polarization in the first state and the RF signals have a second polarization in the second state. The first polarization is substantially different from the second polarization. The method includes steps of transmitting an RF polling signal from a reader to the transponder and detecting a response signal from the transponder. The reader has a plurality of antennas for propagating the RF polling signal. If the response signal has the first polarization, the method includes determining that the transponder is in the first state. If the response signal has the second polarization, the method includes determining that the transponder is in the second state.

In another aspect, the present invention provides an electronic toll collection system. The system includes a transponder having an antenna for propagating RF signals. The transponder has at least a first state of operation and a second state of operation, wherein in the first state the RF signals have a first polarization, and wherein in the second state the RF signals have a second polarization. The first polarization is substantially different from the second polarization. The system also includes a reader having a plurality of antennas for receiving the RF signals from the transponder. The reader includes a detector for determining whether the RF signals have the first polarization or the second polarization, and thereby determining whether the transponder is in the first state or the second state.

In one possible embodiment, the system may be implemented within an electronic toll collection system, wherein the transponders are affixed to the interior of vehicle windshields using a rotatable mounting mechanism having two selectable positions.

In yet a further aspect, the present invention provides an electronic toll collection system that includes a transponder and a reader. The transponder includes a first antenna and a second antenna. The first antenna has a first polarization and the second antenna has a second polarization. The first polarization is substantially different from the second polarization. The reader includes a plurality of antennas for selectively sending first RF signals or second RF signals to the transponder. The first RF signals have the first polarization and the second RF signals have the second polarization. The transponder includes a detector for distinguishing between the first RF signals and the second RF signals.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show example embodiments, and in which.

Similar reference numerals are used in different figures to denote similar components.

DESCRIPTION OF SPECIFIC EMBODIMENTS

Figure 1:
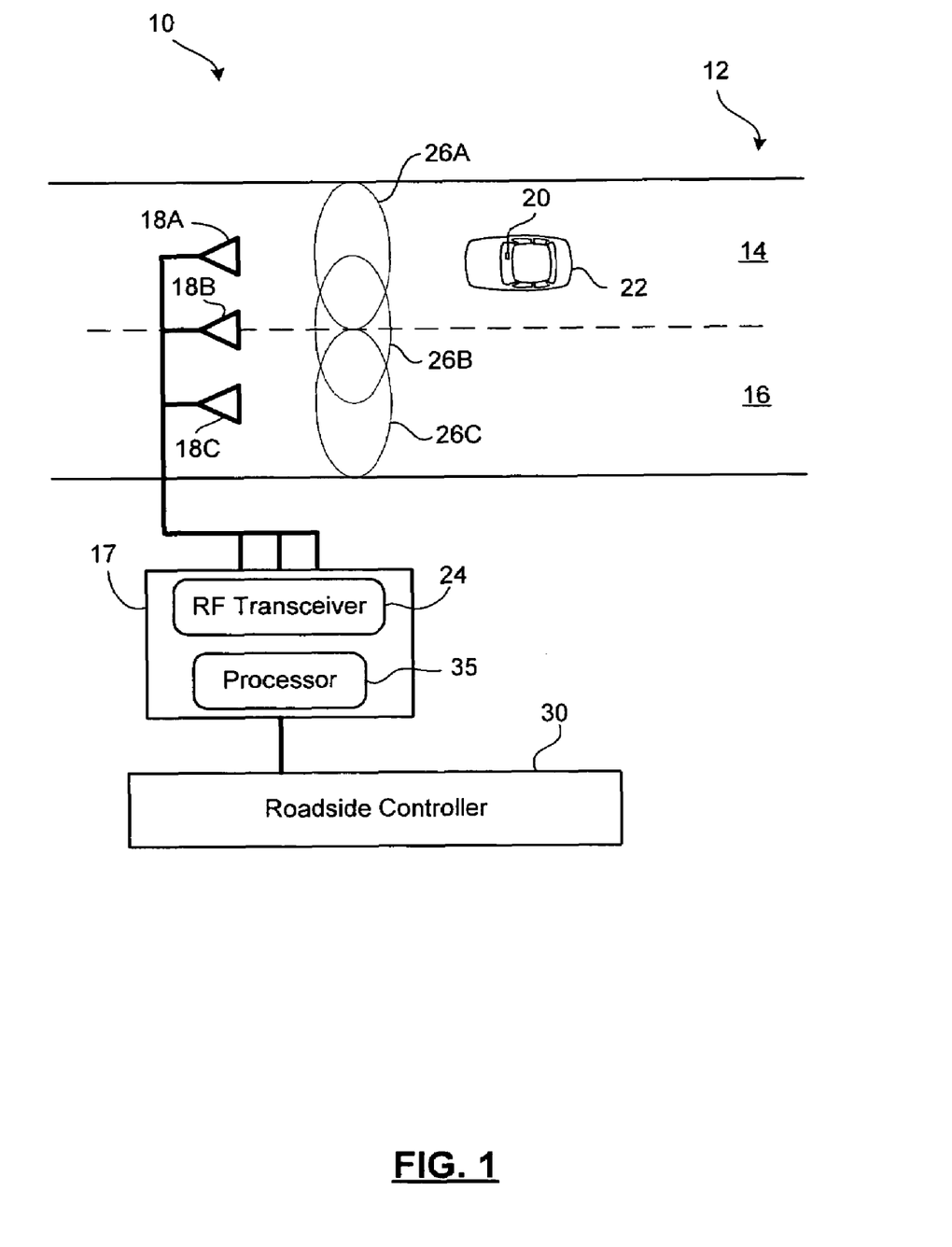
FIG. 1 shows, in diagrammatic form, an electronic toll collection system.

Reference is first made to FIG. 1, which shows, in diagrammatic form, an electronic toll collection system 10. In this example embodiment, the electronic toll collection system 10 is used in connection with a roadway 12 having first and second adjacent lanes 14 and 16. It will be appreciated that in other embodiments the electronic toll collection system 10 may be used in connection with single lane roadways, multi-lane roadways, toll plazas, or other road configurations. The electronic toll collection system 10 may be used in a gated embodiment, wherein the vehicles enter a toll collection area and are signaled, such as by a gate or light, when they are permitted to proceed. The electronic toll collection system 10 may also be used in an open road embodiment, wherein the vehicles are not required to stop or slow down in the toll collection area.

The electronic toll collection system 10 includes a reader 17 connected to a set of antennas 18 (shown individually as 18A, 18B, and 18C). The reader 17 processes signals that are sent and received by the antennas 18, and includes a processor 35 and an RF transceiver 24.

The RF transceiver 24 is configured to modulate signals from the processor 35 for transmission as RF signals over the antennas 18, and to de-modulate RF signals received by the antennas 18 into a form suitable for use by the processor 35. In this regard, the reader 17 employs hardware and signal processing techniques that are well known in the art. The processor 35 includes a programmable processing unit, volatile and non-volatile memory storing instructions and data necessary for the operation of the processor 35, and communications interfaces to permit the processor 35 to communicate with RF module 24 and a roadside controller 30.

The antennas 18, and reader 17 function to trigger or activate a transponder 20 (shown in the windshield of a car 22), to record transponder specific information, and to acknowledge to the transponder 20 that a validated exchange has taken place. The antennas 18 are directional transmit and receive antennas which, in the illustrated preferred embodiment, have an orientation such that each antenna 18 can only receive signals transmitted from a transponder when the transponder is located within a roughly elliptical coverage zone associated with the antenna. The antennas 18 are located above the roadway 12 and arranged such that the antenna 18A has a coverage zone 26A that extends across the first lane 14, antenna 18B has a coverage zone which extends from approximately the center of lane 14 to the center of lane 16, and the antenna 18C has a coverage zone 26C which extends across the entire width of the second lane 16. Each of the coverage zones 26A, 26B and 26C may be of an approximately elliptical shape and may cover an approximately similar sized area. Furthermore, the coverage zones 26A, 26B and 26C may be aligned side-by-side along an axis 28 that is orthogonal to the travel path along roadway 12. As is apparent from FIG. 1, the coverage zone 26A provides complete coverage of the first lane 14, and the coverage zone 26C provides complete coverage of the second lane 16. The coverage zone 26B overlaps both of the coverage zones 26A and 26C.

It will be understood that although the coverage zones 26A, 26B and 26C are illustrated as having elliptical shapes, in many embodiments the actual shapes of the coverage zones 26A, 26B and 26C will typically not be perfectly elliptical, but will have a shape that is dependent upon a number of factors, including RF reflections or interference caused by nearby structures, the antenna pattern and mounting orientation. Prior to operation of the vehicle position determination system 10, the actual approximate coverage shape and size of each of the coverage zones may be determined through well known mapping or approximation techniques, and stored by the processor 35 of the vehicle position determination system 10 such that the size, shape and location of each of the coverage areas 26A, 26B and 26C are generally known and predetermined by the system.

The reader 17 is connected to the roadside controller 30. The electronic toll collection system 10 may include an enforcement system, such as a vehicle imaging system (not shown). The imaging system may include an image processor connected a number of cameras arranged to cover the width of the roadway 12 for capturing images of vehicles. The image processor may be connected to and controlled by the roadside controller 30.

In the example embodiment shown in FIG. 1, the antennas 18 are mounted on an overhead gantry. In order to reduce multi-path problems that occur due to reflections, the antennas of existing readers and transponders are typically linearly polarized. For example, the reader antennas and transponder antennas may be designed and mounted such that each is horizontally linearly polarized. In some embodiments, the transponders are designed to be mounted to a particular portion of the vehicle, such as the windshield or the license plate, in a pre-defined orientation to as to ensure the transponder antenna is oriented correctly to obtain the right polarization vis-à-vis the reader antennas.

In accordance with an embodiment of the present invention, the antennas 18 each include two linearly polarized antennas. In particular, each antenna 18 includes two orthogonally oriented linearly polarized antennas. It will be appreciated that in some embodiments each antenna 18 may be implemented by way of two separate linearly polarized antennas oriented such that they provide substantially orthogonal polarizations. In another embodiment, one or more of the antennas 18 may be implemented by way of dual-mode antenna providing for substantially orthogonal linear polarizations. The references herein to "substantially orthogonal" orientations or polarizations are intended to provide sufficient isolation (from cross-polarization) to prevent reception of linearly polarized signals from a properly oriented transponder on both antennas, as will be described in greater detail below.

Figure 2:
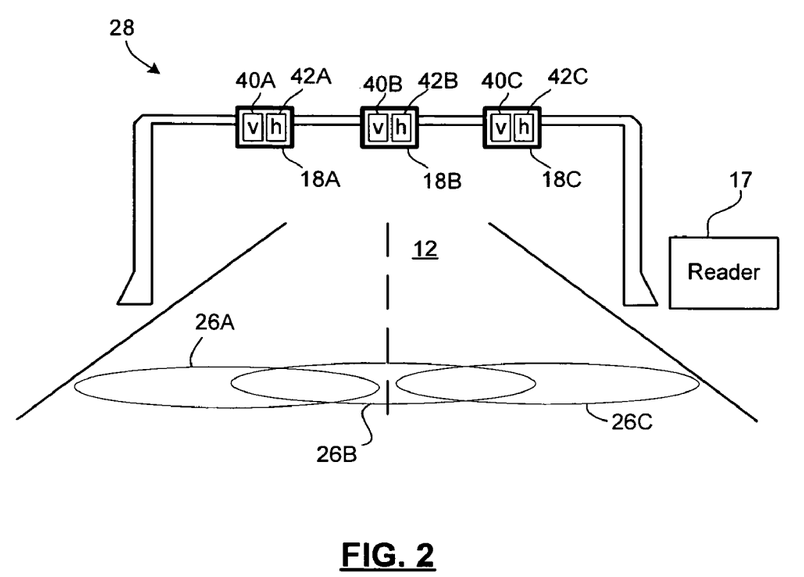
FIG. 2 diagrammatically shows a front view of an overhead gantry spanning the roadway for the electronic toll collection system of FIG. 1.

Reference is now also made to FIG. 2, which diagrammatically shows a front view of an overhead gantry 28 spanning the roadway 12. The antennas 18 are mounted on the overhead gantry 28.

In this embodiment, each of the antennas 18A, 18B, and 18C include a vertically oriented linearly polarized antenna 40 (shown individually as 40A, 40B, and 40C) and a horizontally oriented linearly polarized antenna 42 (shown individually as 42A, 42B, and 42C). The vertically oriented linearly polarized antennas 40A, 40B, and 40C propagate EM signals having a generally vertical polarization. The horizontally oriented linearly polarized antennas 42A, 42B, and 42C propagate EM signals having a generally horizontal polarization. It will be understood that the orientations of the antennas and their respective polarizations need not necessarily be vertical and horizontal provided they are substantially orthogonal relative to each other. It will also be appreciated that in practical embodiments, the polarizations will not be perfectly orthogonal. In at least one embodiment, the vertical antennas 40 are sufficiently orthogonal to the horizontal antennas 42 to prevent significant cross-polarization. Those skilled in the art will appreciate that various configurations and/or an isolation network may be employed to improve polarization diversity.

For each antenna 18A, 18B, and 18C, its respective vertical antenna 40 and horizontal antenna 42 have radiation patterns that define a coverage area roughly equivalent to the coverage areas 26A, 26B, and 26C discussed in connection with FIG. 1. It will be appreciated that the coverage areas defined by two co-located antennas, for example vertical antenna 40A and horizontal antenna 42A, may not be exactly co-extensive; however, they may be designed so as to cover substantially the same area.

In operation, the reader 17 employs time division multiplexing for exciting the various antennas 40, 42, and listening for response signals from any transponders in the coverage areas. For example, the reader 17 may cause the first vertically oriented linearly polarized antenna 40A to broadcast a polling signal in its coverage area and may then await a response signal from any transponders in the area. The reader 17 may then cause the first horizontally oriented linearly polarized antenna 42A to broadcast the polling signal in its coverage area and then await a response signal. Then the reader 17 excites the second vertically oriented linearly polarized antenna 40B and awaits a response signal. In many embodiments, the reader 17 cycles through each of the antennas 40, 42 in turn.

In some embodiments, the reader 17 may further rely upon spatial diversity so as to excite more than one antenna 40, 42 at a time. For example, the reader 17 may employ time division multiplexing across sets of antennas, e.g. groups of four or six antennas. Each grouping or set of antennas 40, 42 may be excited in a time division multiplexed sequence, such that, for example, the first and seventh antennas are being activated at the same time, then the second and eighth antennas, etc., provided that there is sufficient spatial separation between the first and seventh antennas, etc., to prevent interference and allow for simultaneous operation.

In order to further achieve isolation between contemporaneously excited antennas 40, 42, the groups may be arranged such that there is both spatial separation and polarization diversity. For example, the antennas 40, 42 may be grouped such that, if the first antenna in the first group is horizontally polarized, then the first antenna in the second group is vertically polarized.

As noted above, the transponder 20 (FIG. 1) includes a linearly polarized antenna. In conventional ETC systems, the transponder 20 is oriented such that its linear polarization is substantially aligned with the linear polarization of the reader antennas. For example, both the transponder antenna and the reader antenna may be horizontally linearly polarized. In such a system, if the transponder is rotated 90 degrees, such that its antenna is rotated 90 degrees to produce a polarization substantially orthogonal to the previous horizontal polarization, then the transponder and reader will likely be unable to communicate due to the mismatched polarization. A transponder antenna rotated to have a vertical linear polarization will not receive the horizontally polarized polling signal transmitted by the reader antennas in a degree significant enough for the transponder to detect. Similarly, even if the transponder were capable of detecting the polling signal, the reader would not detect the vertically polarized response signal emitted by the transponder due to its horizontally polarized reader antennas. In these circumstances, the transponder will not be detected in the communications zone of the ETC system. Therefore, an effective way of "turning off" the transponder may be rotating the transponder by about 90 degrees to switch the transponder to an orthogonal polarization relative to the ETC system polarization.

In the embodiment shown in FIG. 2, the reader 17 is equipped with both vertically polarized antennas 40 and horizontally polarized antennas 42, and it is therefore capable of triggering transponders that are either vertically or horizontally polarized. Likewise, it is capable of receiving response signals from transponders that are either vertically or horizontally polarized. Accordingly, this enables the transponder user to communicate two-state information to the reader by changing the polarization of the transponder. For example, in one orientation, the transponder receives vertically oriented polling signals and outputs a vertically oriented response signal. By changing the orientation of the transponder, i.e. rotating it by about 90 degrees, the transponder receives horizontally oriented polling signals and outputs a horizontally oriented response signal.

The reader 17 may detect the orientation of the transponder based upon the response signal received by its antennas 40, 42. If one of the vertically oriented antennas 40 receives a response signal, then the reader 17 may conclude that the transponder is vertically oriented. If one of the horizontally oriented antennas 42 receives a response signal, then the reader 17 may conclude that the transponder is horizontally oriented. The two possible orientations of the transponder may be associated with two possible states, which gives the user of the transponder a mechanism for communicating state information to the reader 17 by changing the orientation of the transponder.

Many highways are designed to include high occupancy vehicle (HOV) lanes. An HOV lane is typically a single lane dedicated for use only by passenger vehicles having a minimum number of passengers, for example at least three occupants. The objective of providing HOV lanes is to reduce pollution and traffic congestion by encouraging car pooling, especially amongst commuters. At present, the use of an HOV lane is open to any vehicle and users are expected to abide by the conditions for using the HOV lane on an honor system. At times, police enforce the restrictions by visually observing the number of occupants in a vehicle and pulling over and ticketing those vehicles using the HOV lane that do not contain the minimum number of passengers.

In at least one embodiment, the communication of state information to the ETC system 10 (FIG. 1) may facilitate the operation of occupancy differentiated tolling. For example, a vehicle may indicate it has more than a minimum number of occupants, for example at least three, which entitles it to a different treatment in the ETC system 10. In one example, a high occupancy vehicle may be entitled to pay a reduced toll rate in an effort to encourage car pooling. In another example, a high occupancy vehicle may be entitled to use an HOV lane, which may be associated with a lower or free toll rate, depending on the objectives of the toll road operator.

Figure 3A:
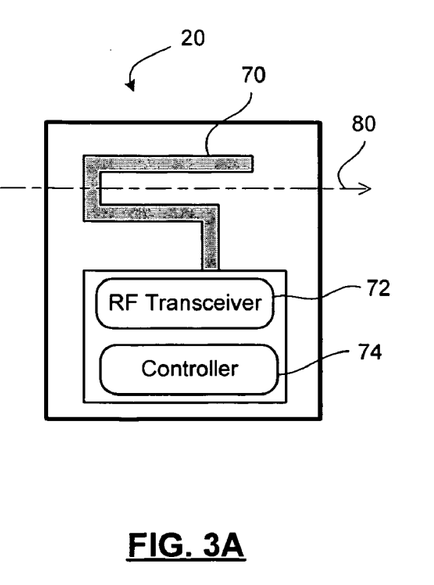
FIGS. 3A and 3B diagrammatically show a transponder according to one embodiment in two possible orientations.
Figure 3B:
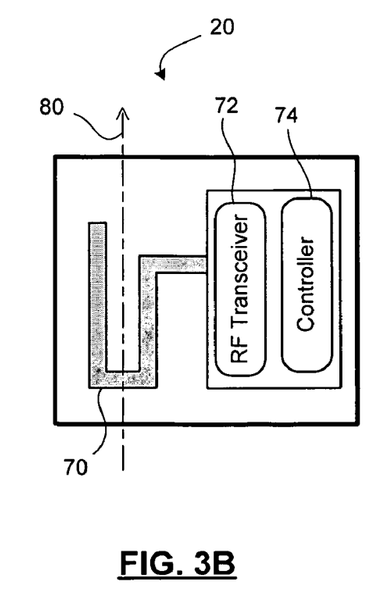

Reference is now made to FIGS. 3A and 3B, which diagrammatically show the transponder 20 according to one embodiment in two possible orientations. The transponder 20 includes an antenna 70. The antenna 70 is a linearly polarized antenna. In the embodiment shown in FIG. 3, the antenna 70 comprises a monopole microstrip meander-line antenna, although other types of antennas may be used in other embodiments. The antenna 70 is connected to a transponder RF transceiver 72 and a transponder controller 74. The components or elements that make up the transponder 20 will be familiar to those of ordinary skill in the art, so a detailed description of these elements is not presented here.

The transponder antenna 70 has a linear polarization, as diagrammatically indicated in. FIGS. 3A and 3B by a polarization vector 80. In the embodiment shown in FIG. 3A, the transponder 20 is oriented such that the antenna 70 is horizontally polarized, i.e. the polarization vector 80 extends in the x-direction. The x- and y-directions define a plane in which the antenna 70 lies. In one embodiment, the orientation shown in FIG. 3A corresponds with mounting the transponder 20 on a windshield of a vehicle or elsewhere on the vehicle, such that the polarization vector 80 is directed substantially transverse to the direction of travel in a roadway, i.e. horizontally directed across the roadway.

FIG. 3B shows the transponder 20 rotated by about ninety degrees. Accordingly transponder 20 is shown in an orientation in which the antenna 70 and its polarization vector 80 have been rotated by ninety degrees. In this orientation, the antenna 70 is vertically polarized, as indicated by the polarization vector 80 extending in the y-direction. In an embodiment in which the transponder 20 is rotatably mounted to the interior of a vehicle windshield, the orientation shown in FIG. 3B, the polarization vector 80 is directed substantially upwards, normal to the roadway. In most embodiments, the pitch of the interior of the vehicle windshield (which is rarely perfectly vertical) results in a substantially vertical polarization vector 80 that is inclined slightly away from the direction of travel, i.e. tilted slightly towards the back of the vehicle, in a z-direction. In practice, this still results in a substantially vertically oriented antenna 70 that is substantially orthogonal from the point of view of a horizontally oriented antenna 70 in the x-direction.

The user of the transponder 20 may select a status, such as, for example, low occupancy or high occupancy, by selecting an orientation for the transponder 20. Accordingly, the user may select between two states, and the transponder 20 communicates that selection to the ETC system 10 (FIG. 1) by virtue of the polarization of its response signal.

As noted above, in connection with FIG. 2, the reader 17 detects the transponder 20 state by detecting the transponder 20 orientation. It does this by using orthogonally polarized antennas 40, 42 to trigger the transponder and listen for response signals from the transponder 20.

In some implementations, multi-path and imperfect polarization diversity may result in detection of the transponder 20 by both vertically oriented antennas 40 and horizontally oriented antennas 42. The reader 17 and, in particular, the processor 35, is then required to determine whether the transponder 20 is vertically or horizontally oriented. A number of techniques may be used by the reader 17 to adjudge the correct orientation of the transponder 20. For example, in one embodiment, the RF transceiver 24 may measure the signal strength of response signals from the transponder 20 received by each of the antennas 18. The processor 35 may then deduce the transponder 20 orientation based upon the signal strength information.

In another example embodiment, the reader 17 may implement a voting mechanism substantially similar to the voting mechanism described in U.S. Pat. No. 6,219,613, issued Apr. 17, 2001, or U.S. patent application Ser. No. 11/176,758, filed Jul. 7, 2005, both owned in common herewith, the contents of which are hereby incorporated by reference. These references describe a voting mechanism and/or method used to count communications on a per antenna basis in order to determine the likely position of a vehicle in a roadway. In some existing systems, the voting mechanisms described in these references are used for making a lane assignment with respect to a vehicle. Similar mechanisms may be used by the reader 17 to count handshakes (e.g. response signals) received by each of the antennas 40, 42, and determine the likely polarization of the antenna based upon the handshake counts.

Figure 4:
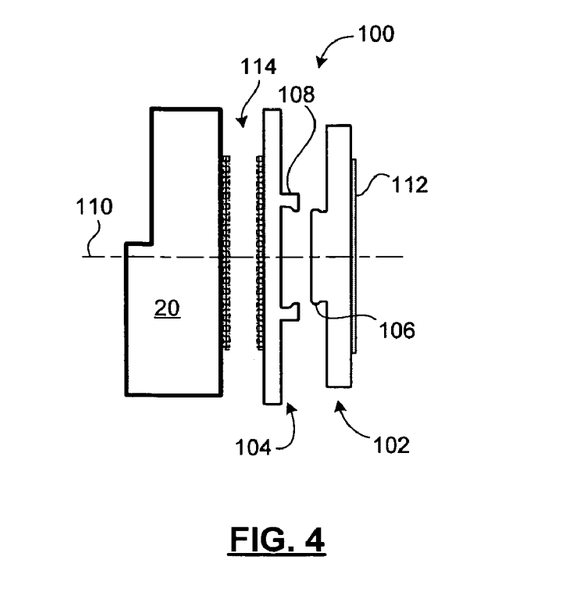
FIG. 4 diagrammatically shows a side view of an embodiment of the transponder and a mounting bracket.

Reference is now made to FIG. 4, which diagrammatically shows a side view of an embodiment of the transponder 20 and a mounting bracket 100.

The mounting bracket 100 is intended to attach the transponder 20 to a vehicle. In one embodiment, the mounting bracket is intended to attach the transponder 20 the interior of a windshield on a vehicle. The mounting bracket 100 is designed so as to allow for rotational movement of the transponder 20 about an axis 110 while mounted.

In this embodiment, the mounting bracket 100 includes two parts: a base portion 102 and a rotatable portion 104. The rotatable portion 104 is rotatably attached to the base portion 102 such that it can pivot about the axis 110. The rotatable portion 104 attaches to the transponder 20, and the base portion 102 attaches to the vehicle windshield.

The base portion 102 and rotatable portion 104 may be formed from suitable plastics using injection molding or other manufacturing techniques. The coupling between the base portion 102 and rotatable portion 104 may include a snap-fit detachable rotary coupling. In one embodiment, the coupling is provided by way of a spindle 106 formed on either the base portion 102 or the rotatable portion 104. A corresponding mating cavity 108 may be formed in the rotabale portion 104 or the base portion 102 for receiving the spindle 106. The spindle 106 and cavity 108 may be formed so as to detachably snap-fit together, in known manner. In another embodiment, the cavity 108 and spindle 106 may be designed to allow for insertion of the spindle 106 in only one or more predefined rotational positions, for example through providing a projection on a side surface of the spindle 106 and a corresponding channel on an interior side surface of the cavity 108, in known manner. Other possibilities will be apparent to those ordinarily skilled in the art.

Howsoever the coupling between the base portion 102 and the rotatable portion 104 is implemented, the coupling may be designed such that it allows for rotational movement between two positions, a first position and a second position, wherein the two positions are selected so as to result in substantially orthogonal positioning of the transponder antenna 70 (FIG. 3) as between the two positions. For example, the second position may be about ninety degrees of rotation about the axis 110 from the first position. The coupling between the base portion 102 and the rotatable portion 104 may be provided with blocking mechanisms that prevent over-rotation, thereby restricting the rotation of the rotatable portion 104 to the ninety degree sweep between the first position and the second position. The coupling may also be provided with a retention mechanism to releasably retain the rotatable portion 104 in either the first position or the second position. An example retention mechanism may include a raised nub and corresponding depression in the respective contacting surfaces of the rotatable portion 104 and base portion 102. These types of mechanisms will be familiar to those of ordinary skill in the art, who will understand the range of possible alternatives for any given embodiment.

The base portion 102 includes an attachment mechanism 112 for attaching the base portion 102 to the windshield. In some embodiments, the attachment mechanism may include an adhesive for adhering to the interior of the windshield. Some pre-existing transponders may have used a hook-and-pile type or reclosable mushroom-head type fastener to adhere the transponder to the interior of the windshield, whereby one half of the fastener is adhesively attached to the windshield and the other half is attached to the transponder to permit the transponder to be detached. For example, a suitable fastener may include the Dual Lock™ fasteners sold by 3M Company of St. Paul, Minn. In these circumstances, the attachment mechanism 112 on the base portion 102 may comprise such fasteners so as to cooperatively engage the preexisting hook-and-pile or mushroom-head fastener adhered to the windshield in connection with previous transponders.

The rotatable portion 104 and transponder 20 may include a fastener 114 therebetween, such as an adhesive, a snap-fit coupling, a releasable hook-and-pile or mushroom-head fastener, or other types of fasteners. In one embodiment, roatable portion 104 is formed as an integral part of the transponder casing, thereby eliminating the need for the separate fastener 114.

In operation, the transponder 20 and/or the mounting bracket 100 may have printed indicia for indicating the first and second position. The indicia may further indicate the states associated with the first and second positions. For example, in one embodiment, the first position may be associated with a "normal" state and the second position may be associated with a "high occupancy" state. The vehicle occupants may select between the two states of operation by rotating the transponder 20 into the position corresponding to the desired state.

Figure 5:
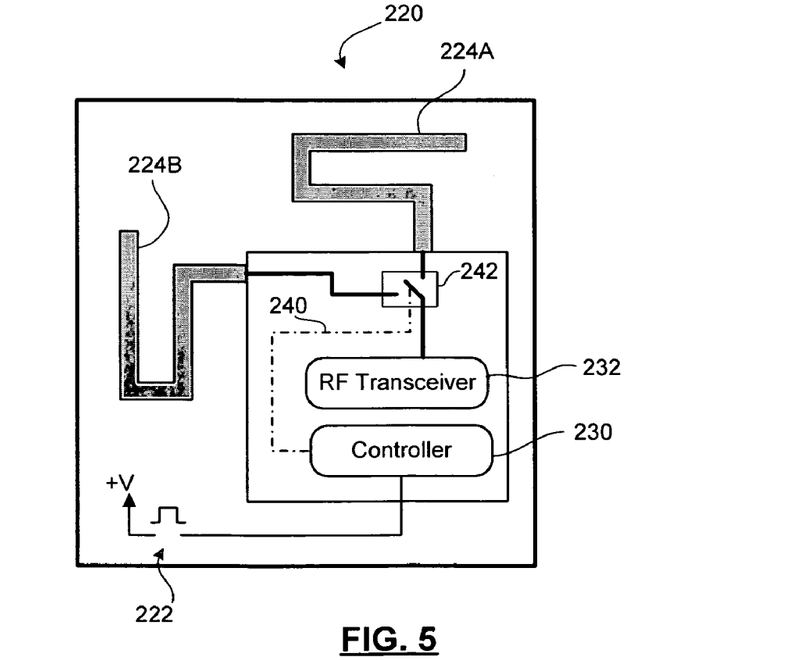
FIG. 5 diagrammatically shows another embodiment of a transponder.

Reference is now made to FIG. 5, which diagrammatically shows another embodiment of a transponder 220. The transponder 220 shown in FIG. 5 is not intended to rotate from a first position to a second position but rather include a switch, button, or other input device 222 to permit user selection of a state. The transponder 220 includes two linearly polarized, substantially orthogonal antennas 224 (shown individually as 224A and 224B). One of the antennas 224A may be horizontally polarized (when the transponder 20 is in its predefined mounted position), and the other antenna 224B may be vertically polarized.

The transponder includes a controller 230 and an RF transceiver 232. The controller 230 receives an input signal from the input device 222. Based upon the input signal the controller 230 may change state, for example from a first state to a second state. The change in state is communicated to a remote reader 17 (FIG. 1) by way of changing the polarization of the transponder 220, which the controller 230 accomplishes by changing the antenna 224 used by the RF transceiver 232 to engage in communications with the remote reader 17.

The transponder 220 may include a switch 242 coupling the antennas 224 to the RF transceiver 232. The switch 242 may function to couple one of the antennas 224 to the RF transceiver in response to a switch signal 240 from the controller 230. The controller 230 may control output of the switch signal 240 based upon the input signal received from the input device 222.

Those of ordinary skill in the art will appreciated that in other embodiments the antennas 224 may be implemented as a single dual mode antenna having orthogonal linear polarizations. The switch 242 may also be incorporated within the RF transceiver 232. In some embodiments, the input device 222 may be configured to directly control operation of the switch 242 without intervention of the controller 230. Other variations and modification will be appreciated by those ordinarily skilled in the art.

Referring still to FIG. 5, in some embodiments the transponder 220 may be employed to detect the polarization used by a reader, rather than having a reader detect the polarization used by the transponder 220. In such embodiments, the transponder 220 may, due to its orthogonal antennas 224, receive both vertically polarized and horizontally polarized signals. A reader in an ETC system may by configured to send either vertically polarized or horizontally polarized signals, depending on its state or the type of ETC transaction that the reader is intended to conduct. For example, in one embodiment, readers assigned to normal lanes of traffic may employ horizontal polarization and readers assigned to an HOV/HOT lane may employ vertical polarization. In these circumstances, perhaps only those persons that have a vehicle equipped with a transponder capable of vertical polarization may be permitted to use the HOV/HOT lane. Perhaps the transponder would output an alert or other signal to the vehicle occupants if it detects a vertically polarized signal so as to warn them they are using an HOV/HOT lane, thereby prompting them to change lanes if they are not entitled to use the HOV/HOT lane. In yet other embodiments, the reader may change the polarization used so as to communicate some other state information to passing transponders. Other possibilities will be apparent to those of ordinary skill in the art. It will be appreciated that the transponder 220 in these example embodiments includes a detector for determining whether a received RF signal from the reader is vertically or horizontally polarized. The detector may employ signal strength measurements, thresholding, or other mechanisms or methods for determining the polarity of the received RF signal.

The use of an ETC transponder to select between a normal state of operation and a high occupancy state still relies upon the user to select the appropriate state. The honor system is still relied upon to ensure that user's are not selecting a high occupancy state in order to pay a (possibly) reduced toll rate. With conventional high occupancy lanes on a roadway, it is easy for enforcement personnel, like police, to identify the vehicles claiming to be high occupancy based upon the fact that the vehicle is in a high occupancy lane. In some embodiments according to the present application, the high occupancy toll may apply to any vehicle in any lane provided the vehicle's transponder indicates a high occupancy state. Therefore, identifying the vehicles that claim to be high occupancy may be more difficult from an enforcement point-of-view.

Figure 6A:
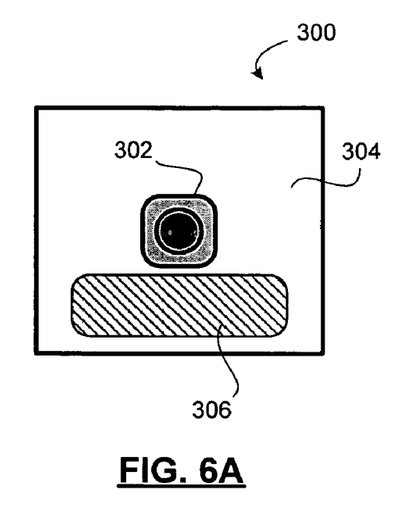
FIGS. 6A and 6B show a back view of an embodiment of a transponder.
Figure 6B:
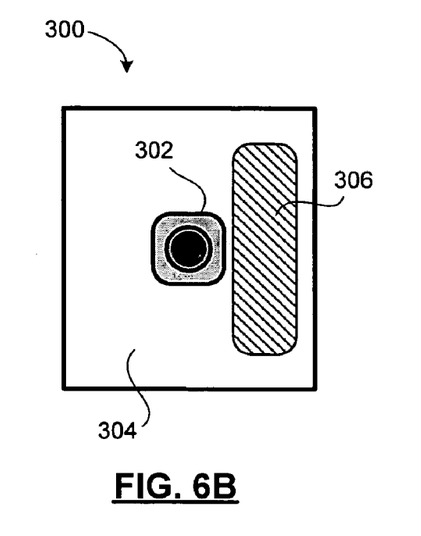

Reference is now made to FIGS. 6A and 6B, which show a back view of an embodiment of a transponder 300. The transponder 300 includes a mounting mechanism 302 that mounts the transponder 300 to the interior of a vehicle windshield. The mounting mechanism 302 provides for pivoting movement of the transponder 300 between a first position and a second position so as to communicate a first state and a second state, as described above in connection with other embodiments.

FIGS. 6A and 6B depict a backside 304 of the transponder 300 and the mounting mechanism 302 as viewed from outside the vehicle, facing the windshield to which they are mounted. In this embodiment, the mounting mechanism 302 is designed so as to be small enough in size to allow the transponder 300 to be seen by persons outside the vehicle. In other words, the mounting mechanism 302 is not so large as to obscure a significant portion of the backside 304 of the transponder 300. The transponder 300 is depicted as being in the first position in FIG. 6A and is depicted as being in the second position in FIG. 6B.

The transponder 300 includes an indicator 306 mounted to the backside 304 of the transponder 300 and visible to persons outside the vehicle. In some embodiments, the indicator 306 may be an adhesive material having a distinctive colour. The indicator 306 may shaped or configured such that a person outside of the vehicle can identify whether the indicator 306 is in the first position shown in FIG. 6A, or in the second position shown in FIG. 6B. Accordingly, based upon the indicator 306, enforcement personnel observing a roadway may determine at a distance whether a vehicle occupant claims to have a high occupancy status. The enforcement personnel may then count the number of persons visible within the vehicle and take enforcement action if it appears that the claim may be false.

Figure 7A:
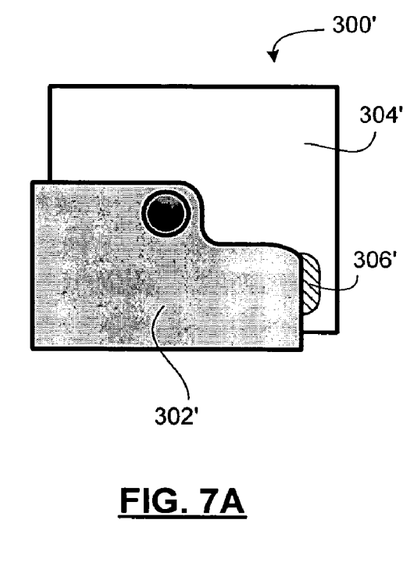
FIGS. 7A and 7B show another embodiment of a transponder and mounting mechanism.
Figure 7B:
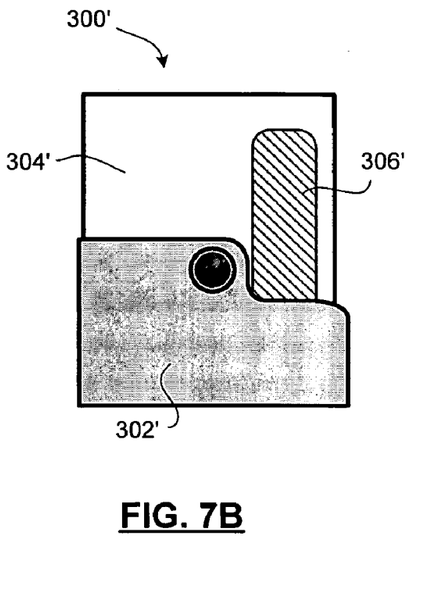

Reference is made to FIGS. 7A and 7B, which show another embodiment of a transponder 300' and mounting mechanism 302'. The transponder 300' has a backside 304' with an indicator 306' attached. In this embodiment, the mounting mechanism 302' obscures a substantial portion of the indicator 306' when the transponder 300' is in the first position shown in FIG. 7A. When the transponder 300' is moved into the second position, shown in FIG. 7B, the indicator 306 is largely visible. Accordingly, a person outside the vehicle may determine whether the transponder 300' is in a first state or a second state based upon whether the indicator 306' is visible.

Figure 8A:
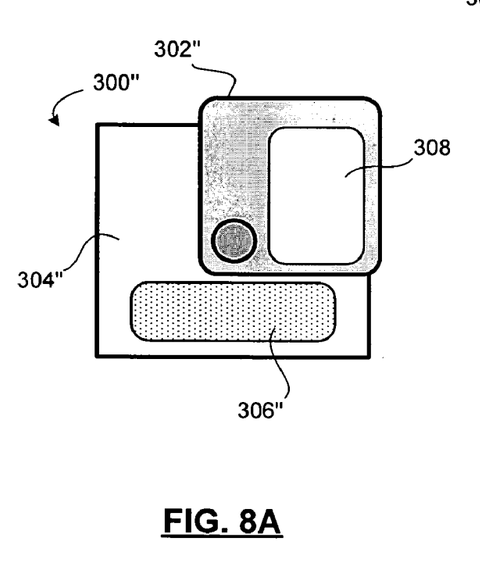
FIGS. 8A and 8B show yet another embodiment of a transponder and a mounting mechanism.
Figure 8B:
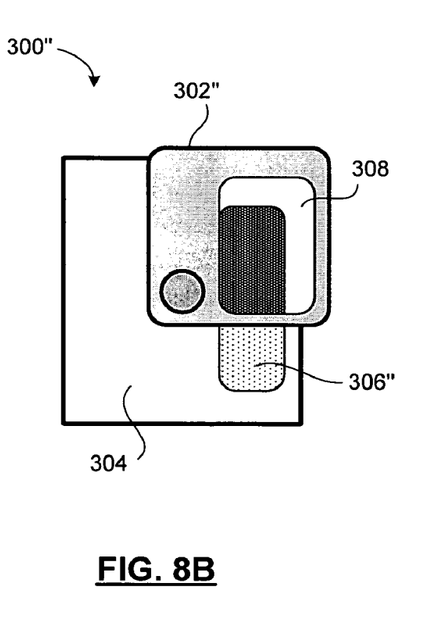

Reference is now made to FIGS. 8A and 8B, which show yet another embodiment of a transponder 300" and a mounting mechanism 302". In this embodiment, the mounting mechanism 302" includes an optical filter 308. The optical filter 308, in this embodiment, is disposed so as to filter the view of the indicator 306" when the transponder 300' is in the second position, as shown in FIG. 8B. Accordingly, the optical filter 308 is intended to produce, in cooperation with the indicator 306" a distinctive color or look when the transponder is in the second position. In such an embodiment, the indicator 306" and optical filter 308 preferably have relatively inconspicuous appearances until they are brought into alignment in the second position.

The indicators 306, 306', 306" shown in FIGS. 6A, 6B, 7A, 7B, 8A, and 8B, are example embodiments. They may be implemented by way of a colored adhesive tape or film. They may be formed from a reflective material, easily discerned through a vehicle windshield.

In other embodiments, other visual indicators may be provided to indicate the state of the transponder. For example, the transponder may incorporate a light or other visual cue that illuminates when the transponder is in the second state. Other examples and possibilities will be apparent to those ordinarily skilled in the art.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for determining a state of a transponder, the transponder having at least a first state of operation and a second state of operation, the transponder including an antenna for propagating RF signals, wherein the RF signals have a first polarization in the first state and the RF signals have a second polarization in the second state, and wherein the first polarization is substantially different from the second polarization, the method comprising the steps of:
    transmitting an RF polling signal from a reader to the transponder, the reader having a plurality of antennas for propagating the RF polling signal;
    detecting a response signal from the transponder;
    if said response signal has said first polarization, determining that the transponder is in said first state; and
    if said response signal has said second polarization, determining that the transponder is in said second state.

2. The method claimed in claim 1, wherein said first polarization is substantially orthogonal to said second polarization.

3. The method claimed in claim 1, wherein said reader includes a first antenna and a second antenna, and wherein said first antenna is oriented with said first polarization and said second antenna is oriented with said second polarization.

4. The method claimed in claim 3, wherein said first antenna and said second antenna comprise a dual-mode antenna.

5. The method claimed in claim 3, wherein said steps of detecting and determining comprise:
    detecting whether said response signal is received by said first antenna and, if so, determining that said response signal has said first polarization, and
    detecting whether said response signal is received by said second antenna and, if so, determining that said response signal has said second polarization.

6. The method claimed in claim 5 for detecting the state of the transponder in an electronic toll collection system associated with a multi-lane roadway, wherein said reader includes a plurality of said first antennas and a plurality of said second antennas, and wherein said method includes repeating said steps of transmitting and detecting, and further includes steps of counting response signals received by said first antennas and said second antennas and identifying whether said transponder is in said first state or said second state based upon said counting.

7. The method claimed in claim 1, further including a step of providing the transponder with a mounting bracket, wherein said mounting bracket includes a rotatable mechanism for rotating said transponder about an axis between a first position and a second position, and wherein in said first position the transponder is oriented to emit the response signal with said first polarization, and wherein said second position the transponder is oriented to emit the response signal with said second polarization.

8. The method claimed in claim 7, wherein said first position and said second position comprise positions about ninety degrees apart in rotation.

9. The method claimed in claim 1 for detecting the state of the transponder in an electronic toll collection system, wherein the transponder is mounted to a vehicle, and wherein said plurality of antennas for said reader comprises antennas associated with a roadway.

10. The method claimed in claim 9, wherein said first state comprises a normal state of operation and wherein second state comprises a high-occupancy state of operation.

11. The method claimed in claim 10, further including a step of processing a toll transaction, said toll transaction including a toll payment, and wherein said toll payment is different depending on whether the transponder is in said first state or said second state.

12. An electronic toll collection system, comprising:
a transponder including an antenna for propagating RF signals, the transponder having at least a first state of operation and a second state of operation, wherein in said first state the RF signals have a first polarization, and wherein in the second state the RF signals have a second polarization, and wherein said first polarization is substantially different from said second polarization; and
a reader including a plurality of antennas for receiving the RF signals from said transponder, the reader including a detector for determining whether said RF signal have said first polarization or said second polarization, and thereby determining whether said transponder is in said first state or said second state.

13. The system claimed in claim 12, wherein said first polarization is substantially orthogonal to said second polarization.

14. The system claimed in claim 12, wherein said plurality of antennas include a first antenna and a second antenna, and wherein said first antenna is oriented with said first polarization and said second antenna is oriented with said second polarization, and wherein said detector includes an RF transceiver having a first input coupled to the first antenna and a second input coupled to the second antenna.

15. The system claimed in claim 14, wherein said first antenna and said second antenna comprise a dual-mode antenna.

16. The system claimed in claim 14, wherein said detector is configured to detect whether said RF signals are received by said first antenna and, if so, determine that said RF signals have said first polarization, and detect whether said RF signals are received by said second antenna and, if so, determine that said RF signals have said second polarization.

17. The system claimed in claim 16 wherein said reader is associated with a multi-lane roadway, wherein said plurality of said first antennas and a plurality of said second antennas, and wherein said reader includes an RF transceiver for sequentially exciting said plurality of antennas to emit a polling signal in a polling cycle, and wherein said transponder transmits said RF signals in response to one or more of said polling signals, and wherein said detector is configured to count said RF signals received by said first antennas and said second antennas and identify by a voting algorithm whether said transponder is in said first state or said second state based upon said count.

18. The system claimed in claim 12, wherein said transponder antenna comprises a linearly polarized antenna, and wherein said transponder includes a selection mechanism having a first position and a second position, said first position corresponding to said first state and said second position corresponding to said second state, and wherein in said first position said linearly polarized antenna has a first orientation, and wherein in said second position said linearly polarized antenna has a second orientation.

19. The system claimed in claim 18, wherein said selection mechanism comprises a mounting bracket, and wherein said mounting bracket includes a rotatable mechanism for rotating said transponder about an axis between said first position and said second position, and wherein in said first position the transponder is oriented to emit the response signal with said first polarization, and wherein said second position the transponder is oriented to emit the response signal with said second polarization.

20. The system claimed in claim 19, wherein said first position and said second position comprise positions about ninety degrees apart in rotation.

21. The system claimed in claim 12, wherein said first state comprises a normal state of operation and wherein second state comprises a high-occupancy state of operation.

22. The system claimed in claim 12, further including a toll transaction processor for processing a toll transaction relating to said transponder, said toll transaction including a toll payment, and wherein said toll payment is different depending on whether said transponder is in said first state or said second state.

23. An electronic toll collection system, comprising:
a transponder including a first antenna and a second antenna, the first antenna having a first polarization and the second antenna having a second polarization, wherein said first polarization is substantially different from said second polarization; and
a reader including a plurality of antennas for selectively sending first RF signals or second RF signals to said transponder, wherein said first RF signals have said first polarization and said second RF signals have said second polarization,
and wherein said transponder includes a detector for distinguishing between said first RF signals and said second RF signals.

* * * * *